United States Patent
Nashiki et al.

(10) Patent No.: US 8,531,406 B2
(45) Date of Patent: Sep. 10, 2013

(54) TRANSPARENT CONDUCTIVE FILM, ELECTRODE SHEET FOR USE IN TOUCH PANEL, AND TOUCH PANEL

(75) Inventors: Tomotake Nashiki, Ibaraki (JP); Hidetoshi Yoshitake, Ibaraki (JP); Hideo Sugawara, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 1077 days.

(21) Appl. No.: 12/066,567

(22) PCT Filed: Aug. 30, 2006

(86) PCT No.: PCT/JP2006/317055
§ 371 (c)(1),
(2), (4) Date: Mar. 12, 2008

(87) PCT Pub. No.: WO2007/032205
PCT Pub. Date: Mar. 22, 2007

(65) Prior Publication Data
US 2009/0284475 A1    Nov. 19, 2009

(30) Foreign Application Priority Data
Sep. 12, 2005 (JP) .................. 2005-263483

(51) Int. Cl.
*G06F 3/041* (2006.01)
(52) U.S. Cl.
USPC ......................................... 345/173; 200/512
(58) Field of Classification Search
USPC ........... 345/173; 428/141; 257/40; 313/506
See application file for complete search history.

(56) References Cited

U.S. PATENT DOCUMENTS

| 6,495,253 | B1 | 12/2002 | Koyama et al. |
| 6,987,354 | B2 * | 1/2006 | Arakawa et al. .............. 313/506 |
| 7,060,320 | B1 | 6/2006 | Omote et al. |
| 2002/0142133 | A1 * | 10/2002 | Matsunaga et al. .......... 428/141 |
| 2002/0154100 | A1 * | 10/2002 | Hatakeda et al. ............. 345/173 |
| 2003/0071794 | A1 | 4/2003 | Arakawa et al. |

(Continued)

FOREIGN PATENT DOCUMENTS

| JP | 2-213006 A | 8/1990 |
| JP | 05-338086 A | 12/1993 |

(Continued)

OTHER PUBLICATIONS

International Search Report of PCT/JP2006/317055, date of mailing Nov. 28, 2006.

(Continued)

*Primary Examiner* — Quan-Zhen Wang
*Assistant Examiner* — Troy Dalrymple
(74) *Attorney, Agent, or Firm* — Westerman, Hattori, Daniels & Adrian, LLP

(57) ABSTRACT

A transparent conductive film comprising a transparent film base material, a resin layer having a fine uneven geometrical structure, and a transparent conductive thin film laminated on the film base material through the resin layer, wherein the surface of the transparent conductive thin film has an average centerline roughness (Ra) of 0.11 to 0.18 μm, the maximum height (Ry) of 0.9 to 1.6 μm and the average distance between peaks (S) of 0.05 to 0.11 mm. The film can prevent the formation of a Newton's ring and shows satisfactory durability (particularly, pen input durability) and satisfactory display property without buzzing.

11 Claims, 2 Drawing Sheets

(56) References Cited

U.S. PATENT DOCUMENTS

| | | |
|---|---|---|
| 2005/0064142 A1 | 3/2005 | Matsunaga et al. |
| 2005/0221054 A1 | 10/2005 | Kawano et al. |
| 2007/0221911 A1* | 9/2007 | Van Mol et al. ............ 257/40 |

FOREIGN PATENT DOCUMENTS

| | | | | |
|---|---|---|---|---|
| JP | 06222352 | A | * | 8/1994 |
| JP | 8-77871 | A | | 3/1996 |
| JP | 8-174745 | A | | 7/1996 |
| JP | 8-281856 | A | | 10/1996 |
| JP | 08281856 | A | * | 10/1996 |
| JP | 10-323931 | A | | 12/1998 |
| JP | 10323931 | A | * | 12/1998 |
| JP | 11-250764 | A | | 9/1999 |
| JP | 2000-351170 | A | | 12/2000 |
| JP | 2001-84839 | A | | 3/2001 |
| JP | 2002-313141 | A | | 10/2002 |
| JP | 2002-313142 | A | | 10/2002 |
| JP | 2002-373056 | A | | 12/2002 |
| JP | 2003-045234 | A | | 2/2003 |
| JP | 2003-316505 | A | | 11/2003 |
| JP | 2003316505 | A | * | 11/2003 |
| JP | 2006-179274 | A | | 7/2006 |
| JP | 2006-190508 | A | | 7/2006 |
| KR | 2002-0052999 | | | 7/2002 |
| TW | 508524 | | | 7/1988 |
| TW | 200305509 | | | 3/1992 |

OTHER PUBLICATIONS

Japanese Office Action dated Mar. 31, 2011, issued in corresponding Japanese Patent Application No. 2006-225493.
Korean Office Action dated Jul. 15, 2009, issued in counterpart Korean Patent Application No. 10-2008-7001402.
Notification of Transmittal of Translation of the International Preliminary Report on Patentability (Form PCT/IB/338) of International Application No. PCT/JP2006/317055 mailed Sep. 18, 2008 with Forms PCT/IB/373 and PCT/ISA/237.
Taiwanese Office Action dated Oct. 23, 1998, issued in corresponding Taiwanese Patent Application No. 095132546.
Notification of Transmittal of Translation of the International Preliminary Report on Patentability (Form PCT/IB/326) of International Application No. PCT/JP2006/317055 mailed Mar. 27, 2008 with Forms PCT/IB/373 and PCT/ISA/237.

* cited by examiner

TRANSPARENT CONDUCTIVE FILM, ELECTRODE SHEET FOR USE IN TOUCH PANEL, AND TOUCH PANEL

TECHNICAL FIELD

The invention relates to transparent conductive films. The invention also relates to electrode sheet for use in touch panel using the transparent conductive films. The invention also relates to touch panels using the electrode sheet for use in touch panel.

BACKGROUND ART

Thin films that are transparent in the visible light range and have electrical conductivity are used for transparent electrodes in touch panels and advanced display systems such as liquid crystal displays and electroluminescence displays and also used for electromagnetic wave shielding or prevention of static charge of transparent products.

Concerning conventional transparent conductive thin films, the so-called conductive glass is well known, which includes a glass member and an indium oxide thin film formed thereon. Since the base member of the conductive glass is made of glass, however, it has low flexibility or workability and cannot be used for certain purposes.

In recent years, therefore, transparent conductive films using various types of plastic films such as polyethylene terephthalate films as their substrate have been used, because of their advantages such as good impact resistance and light weight as well as flexibility and workability.

However, touch panels using such conventional transparent conductive thin films have a problem in which Newton's rings are formed when touch panels are pressed by fingers or the like. In order to prevent the formation of such Newton's rings, for example, it is proposed that a transparent conductive film should include a coating layer with a thickness of 1 to 3 μm between a transparent plastic and a transparent conductive thin film, wherein a filler with an average particle size of 1 to 4 μm is contained at a number average density of 500 to 3000/mm$^2$ in the coating layer (see Patent Literature 1 listed below) and that the transparent conductive film to be used should include a transparent resin film and a 20 to 55 nm-thick silicon oxide thin film layer and a transparent thin film electrode layer formed in this order on the resin film, wherein the surface of the transparent thin film electrode layer has an average centerline roughness (Ra) of 0.05 to 2 μm and a maximum height (Rmax) of 0.6 μm to 2.5 μm (see Patent Literature 2 listed below). The formation of Newton's rings can be reduced in a touch panel using the proposed transparent conductive film as a touch panel electrode sheet.

On the other hand, transparent conductive films have a problem in which their conductive thin films have poor scratch resistance or bending resistance so that they can be scratched during use to have increased electric resistance or to suffer from disconnection. When used in a touch panel, a pair of conductive thin films placed opposite to each other with spacers interposed therebetween are strongly brought into contact with each other by pressing and tapping from one panel plate side. Therefore, it is desired that transparent conductive films should have high durability to pressing and tapping, specifically tapping resistance, particularly pen input durability. However, the transparent conductive film in which the transparent conductive thin film has controlled irregularities in order to prevent Newton's rings as described in the patent literature cannot have satisfactory durability. Therefore, such a transparent conductive film has a problem in which when it can suppress the formation of Newton's rings, it rather has poor durability so that it can form a touch panel with a short life.

Conventional transparent conductive films also have the problem of low transparency, because the surface of their thin film has high light reflectance. Even when transparent conductive thin films have controlled irregularities as described above, however, display characteristics with respect to glare, image formability and so on are not satisfactory.

Patent Literature 1: Japanese Patent Application Laid-Open (JP-A) No. 10-323931
Patent Literature 2: JP-A No. 11-250764

DISCLOSURE OF THE INVENTION

Problems to be Solved by the Invention

It is an object of the invention to provide a transparent conductive film that includes a transparent film base material, a resin layer having fine irregularities, and a transparent conductive thin film placed on one side of the film base material with the resin layer interposed therebetween and can prevent the formation of Newton's rings and provide satisfactory durability (particularly satisfactory pen input durability) and satisfactory display characteristics with respect to glare and so on.

It is another object of the invention to provide a touch panel electrode sheet using such a conductive laminated film and to provide a touch panel using such a touch panel electrode sheet.

Means for Solving the Problems

As a result of investigations for solving the problems, the inventors have found the transparent conductive film described below and have completed the invention.

Namely, the transparent conductive film of the present invention is a transparent conductive film, comprising: a transparent film base material; a resin layer having fine irregularities; and a transparent conductive thin film placed on one side of the transparent film base material with at least the resin layer interposed therebetween, the transparent conductive thin film having a surface with an average centerline roughness (Ra) of 0.11 μm to 0.18 μm, a maximum height (Ry) of 0.9 μm to 1.6 μm, and an average peak-to-peak distance (S) of 0.05 mm to 0.11 mm.

In the above, it is preferable that the surface of the transparent conductive thin film has a ten-point average roughness (Rz) of 0.6 to 1 μm.

In the above, it is preferable that the resin layer having fine irregularities contains fine particles for forming the fine irregularities.

In the above, it is preferable that the fine particles are a mixture of fine particles having an average particle size of 2±0.4 μm and a particle size standard deviation within 20% of the average particle size and fine particles having an average particle size of 3±0.4 μm and a particle size standard deviation within 20% of the average particle size.

In the above, it is preferable that the resin layer has a coating thickness of 0.5 to 2 μm.

In the above, it is preferable that the transparent conductive film further includes a transparent dielectric thin film between the resin layer and the transparent conductive thin film.

In the above, it is preferable that the transparent conductive film further includes a transparent substrate and a transparent pressure-sensitive adhesive layer, wherein a side of the transparent film base material where the transparent conductive thin film is not provided is bonded to the transparent substrate with the transparent pressure-sensitive adhesive layer interposed therebetween. In the above, it is preferable that the transparent substrate is a transparent laminated substrate comprising at least two transparent substrate films laminated with a transparent pressure-sensitive adhesive layer interposed therebetween.

Also, the touch panel electrode sheet of the present invention is a touch panel electrode sheet, comprising the above-mentioned transparent conductive film.

Also, the touch panel of the present invention is a touch panel, comprising: a touch panel electrode sheet that has a transparent conductive thin film and is provided on a touch side; another touch panel electrode sheet that has a transparent conductive thin film and is provided on a display side; and a spacer, wherein the electrode sheet for use in touch panel are placed opposite to each other with the spacer interposed therebetween such that the transparent conductive thin films face each other, and at least one of the electrode sheet for use in touch panel comprises the above-mentioned touch panel electrode sheet.

In the above, it is preferable that the above-mentioned touch panel electrode sheet is provided on at least the display side.

Effects of the Invention

In the transparent conductive film of the invention, the irregular surface profile of the transparent conductive thin film is controlled by the resin layer having fine irregularities. The surface profile is identified by the average centerline roughness (Ra), the maximum height (Ry) and the average peak-to-peak distance (S). According to the invention, these values are each controlled to be in a very narrow range so that the formation of Newton's ring can be prevented and that durability, particularly pen input durability, and display characteristics with respect to glare, image formability and so on can be satisfactory.

DESCRIPTION OF REFERENCE MARKS

Figure 1:
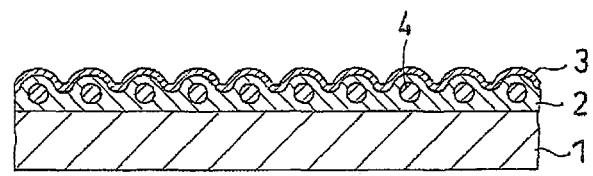
FIG. 1 is a cross-sectional view showing an example of the transparent conductive film of the invention.

In the drawings, reference mark 1 represents a transparent film base material, 2 a resin layer having fine irregularities, 3 a transparent conductive thin film, 4 fine particles, 5 a transparent dielectric thin film, 6 a transparent substrate, 7 a pressure-sensitive adhesive layer, P1 a panel plate, P2 a panel plate, and S spacers.

BEST MODE FOR CARRYING OUT THE INVENTION

The transparent conductive film of the invention is described below with reference to the drawings. FIG. 1 shows an example of the transparent conductive film of the invention, which includes a transparent film base material 1, a resin layer 2 having fine irregularities, and a transparent conductive thin film 3 placed on one side of the film base material 1 with the resin layer 2 interposed therebetween. In FIG. 1, fine particles 4 are contained in the resin layer 2 such that the surface of the resin layer 2 forms fine irregularities and that the surface of the transparent conductive thin film 3 also forms fine irregularities.

The surface profile of the transparent conductive thin film is controlled to have an average centerline roughness (Ra) of 0.11 to 0.18 μm, a maximum height (Ry) of 0.9 to 1.6 μm, and an average peak-to-peak distance (S) of 0.05 to 0.11 mm.

The Ra is controlled in terms of preventing the formation of Newton's rings and ensuring durability. The Ra is preferably from 0.12 to 0.17 μm, more preferably from 0.13 to 0.16 μm. The Ry is controlled in terms of preventing the formation of Newton's rings and ensuring durability. The Ry is preferably from 1 to 1.5 μm, more preferably from 1.1 to 1.5 μm. The S is controlled in terms of suppressing glare. The S is preferably in the range of 0.06 to 0.10 mm, more preferably of 0.07 to 0.10 mm.

The surface profile of the transparent conductive thin film preferably has a ten-point average roughness (Rz) of 0.6 to 1 μm. The Rz is more preferably from 0.7 to 1 μm, still more preferably from 0.8 to 1 μm.

The transparent conductive film of the invention also preferably has a haze of 2.5%, more preferably of 2%, in view of transparency.

In an embodiment of the invention, any appropriate material may be chosen and used for the transparent film base material. Examples of materials for the transparent film base material include polyester resins, acetate resins, polyethersulfone resins, polycarbonate resins, polyamide resins, polyimide resins, polyolefin resins, acrylic resins, polyvinyl chloride resins, polystyrene resins, polyvinyl alcohol resins, polyarylate resins, polyphenylene sulfide resins, polyvinylidene chloride resins, and (meth)acrylic resins. In particular, polyester resins, polycarbonate resins, and polyolefin resins are preferred.

The thickness of the film base material is preferably, but not limited to, in the range of 2 to 300 μm, particularly preferably in the range of 10 to 130 μm. The film base material with a thickness of less than 2 μm can have insufficient mechanical strength and can make it difficult to continuously form a thin film such as the transparent conductive thin film on the substrate fed from a roll. The film base material with a thickness of more than 300 μm can have a problem with winding ability and can make it difficult to form the transparent conductive thin film by a process with a roll.

The surface of the film base material may be previously subject to sputtering, corona discharge treatment, flame treatment, ultraviolet irradiation, electron beam irradiation, chemical treatment, etching treatment such as oxidation, or undercoating treatment such that the adhesion of the resin layer having fine irregularities onto the film base material can be improved. If necessary, the film base material may also be subjected to dust removing or cleaning by solvent cleaning, ultrasonic cleaning or the like, before the resin layer having fine irregularities is formed thereon.

In an embodiment of the invention, the resin layer having fine irregularities is formed on one side of the film base material prepared as described above, and then the transparent conductive thin film is formed thereon.

Any appropriate method may be used for forming the resin layer having fine irregularities. For example, a method for forming the resin layer includes roughening the surface of a resin layer-forming film in advance by an appropriate method such as sand blasting, embossing rolling or chemical etching so that fine irregularities are formed on the surface of the resin layer-forming material itself. Another method for forming the resin layer includes forming an additional resin layer on a resin layer by coating and forming fine irregularities on the surface of the additional resin layer by a transfer method with a die or any other transfer method. A further method for forming the resin layer includes adding and dispersing fine particles into a resin layer as shown in FIG. 1 to form fine irregularities. Two or more of these methods for forming fine irregularities may be used in combination so that a composite layer having different types of fine surface irregularities may be formed. Among the methods for forming the resin layer, the method including adding and dispersing fine particles into the resin layer is preferred in view of the productivity of fine surface irregularities and the like.

A description is given below of a method of forming the resin layer by adding and dispersing fine particles. Any type of resin capable of allowing fine particles to be dispersed therein, forming a resin film with sufficient strength and providing transparency may be used for forming the resin layer. The resin may be a thermosetting resin, a thermoplastic resin, an ultraviolet curable resin, an electron beam curable resin, a two-component resin, or the like. In particular, an ultraviolet curable resin is preferred, because a light diffusion layer can be efficiently produced with it by ultraviolet curing and simple processing.

The ultraviolet curable resin may be any of various resins such as polyester, acrylic, urethane, amide, silicone, and epoxy resins, and may include an ultraviolet curable monomer, oligomer, polymer, and so on. For example, ultraviolet curable resin that may be preferably used includes an acrylic monomer or oligomer component having one, two or more, particularly three to six ultraviolet polymerizable functional groups. The ultraviolet curable resin may also contain an ultraviolet polymerization initiator.

Besides the materials described above, an additive such as a leveling agent, a thixotropic agent and an antistatic agent may be used as a material for forming the resin layer. The thixotropic agent is advantageously used to form particulate projections of the fine surface irregularities. The thixotropic agent may be silica, mica or the like with a size of 0.1 µm or less. The content of the additives is generally about 15 parts by weight or less, preferably from 0.1 to 15 parts by weight, based on 100 parts by weight of the ultraviolet curable resin.

Fine particles may be of any material having transparency, such as various types of metal oxide, glass, and plastics. Examples of the fine particles include inorganic fine particles such as silica, alumina, titania, zirconia, and calcium oxide fine particles; crosslinked or non-crosslinked organic fine particles of various polymers such as poly(methyl methacrylate), polystyrene, polyurethane, acrylic resin, acrylic-styrene copolymer, benzoguanamine polymer, melamine polymer, and polycarbonate. While one or more types of fine particles may be selected and used, organic fine particles are preferably used. Such organic fine particles are preferably of acrylic resin, in view of refractive index.

The fine particles may have any average particle size as long as the fine surface irregularities with the above Ra, Ry, S, or the like can be formed. The fine particles to be used may generally have an average particle size in the range of about 1 to about 10 µm, preferably in the range of about 1 to about 4 µm. Fine particles with different particle sizes may also be used in combination. In particular, different types of monodisperse fine particles each having a particle size standard deviation within 20% of the average particle size are preferably used in combination. In an embodiment of the invention, fine particles having an average particle size of 2±0.4 µm and a particle size standard deviation within 20% of the average particle size are preferably used in combination with fine particles having an average particle size of 3±0.4 µm and a particle size standard deviation within 20% of the average particle size to form a mixture. The fine particles having an average particle size of 2±0.4 µm preferably have an average particle size of 2±0.3 µm, more preferably of 2±0.2 µm, still more preferably of 2±0.1 µm. The fine particles having an average particle size of 3±0.4 µm preferably have an average particle size of 3±0.3 µm, more preferably of 3±0.2 µm, still more preferably of 3±0.1 µm. In both cases, the standard deviation is preferably within 15% of the average particle size, more preferably within 10% of the average particle size. The mixing ratio (by weight) between the fine particles having an average particle size of 2±0.4 µm and the fine particles having an average particle size of 3±0.4 µm is generally from 50:50 to 99:1, preferably from 80:20 to 99:1 (former:latter).

Any appropriate method may be used to form the fine particle-containing resin layer. For example, such a method includes applying a fine particle-containing resin (such as an ultraviolet curable resin coating liquid) to the transparent film base material, drying the coating, and then curing the coating to form a resin layer whose surface has irregularities. The coating liquid may be applied by an appropriate method such as fountain coating, die coating, casting, spin coating, fountain metaling, and gravure coating.

The content of the fine particles in the coating liquid is preferably, but not limited to, from 0.1 to 20 parts by weight, more preferably from 0.1 to 10 parts by weight, based on 100 parts by weight of the resin, in terms of forming fine surface irregularities with the above Ra, Ry, S, or the like.

The thickness of the resin layer is preferably, but not limited to, from about 0.5 to about 7 µm, particularly preferably from 0.5 to 2 µm, in view of cracking or curling resistance. The thickness of the resin layer may be calculated from the amount of the material used for forming the resin layer and the area of the coating. When a coating liquid is used to form the resin layer, the thickness of the resin layer may be calculated from the difference between the weights before and after the application of the coating liquid.

The transparent conductive thin film is formed on the resin layer. The transparent conductive thin film may be formed by an appropriate method selected from various thin-film forming methods such as vacuum deposition, sputtering, ion plating, spraying heat decomposition, chemical plating, electroplating, and any combination thereof. Vacuum deposition or sputtering is preferably used as a method for forming the thin film, in view of productivity, large-area film forming ability, or speed of forming the transparent conductive thin film.

Any appropriate material capable of forming transparent conductive films may be selected and used as a material for forming the transparent conductive thin film. Examples of materials for preferred use in forming the transparent conductive thin film include metal of gold, silver, platinum, palladium, copper, aluminum, nickel, chromium, titanium, iron, cobalt, tin, or any alloy thereof; metal oxide of indium oxide, tin oxide, titanium oxide, cadmium oxide, or any combination thereof; and any other metallic compound of copper iodide or the like. In particular, tin oxide-doped indium oxide or antimony-doped tin oxide is preferably used. Tin oxide-doped indium oxide is particularly preferred.

The transparent conductive thin film may have any appropriate thickness, which is chosen depending on the intended use. The thickness of the transparent conductive thin film is generally from 10 to 300 nm, preferably from 10 to 200 nm.

The transparent conductive thin film with a thickness of less than 10 nm can have difficulty in forming a continuous coating film with good conductivity characterized by a surface resistance of $10^3$ Ω/square or less. If the transparent conductive thin film is too thick, a reduction in transparency and the like can tend to occur.

Figure 2:
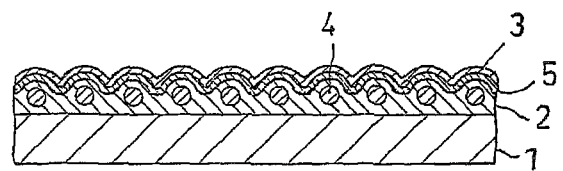
FIG. 2 is a cross-sectional view showing another example of the transparent conductive film of the invention.

The transparent conductive film of the invention essentially includes the transparent film base material 1, the resin layer 2 with fine irregularities, and the transparent conductive thin film 3 placed on one side of the film base material 1 with the resin layer 2 interposed therebetween. The transparent conductive film of the invention may further include any other layer. As shown in FIG. 2, for example, at least one layer of a transparent dielectric thin film (transparent dielectric layer) 5 may be provided between the resin layer 2 and the transparent conductive thin film 3. A hard coat layer or a visibility enhancement layer such as an antiglare or antireflection layer may be formed on the other side of the transparent film base material 1 where neither the resin layer 2 nor the transparent conductive thin film 3 is provided.

The formation of the transparent dielectric thin film is effective in increasing the adhesion between the resin layer and the transparent conductive thin film, increasing the scratch or bending resistance of the transparent conductive thin film, and increasing the tapping resistance for touch panels. When two or more layers of the transparent dielectric thin film are used, the refractive index of each transparent dielectric layer may be controlled such that the above properties can be further improved.

The transparent dielectric thin film may be made of an inorganic material, an organic material or a mixture of inorganic and organic materials. Examples of the inorganic material that may be preferably used include NaF (1.3), $Na_3AlF_6$ (1.35), LiF (1.36), $MgF_2$ (1.38), $CaF_2$ (1.4), $BaF_2$ (1.3), $SiO_2$ (1.46), $LaF_3$ (1.55), $CeF_3$ (1.63), and $Al_2O_3$ (1.63), wherein each number inside the parentheses indicates the light refractive index of each material. Examples of the organic material include acrylic resins, urethane resins, melamine resins, alkyd resins, and siloxane polymers. In particular, a thermosetting resin including a mixture of a melamine resin, an alkyd resin and an organic silane condensate is preferably used as the organic material.

The transparent dielectric thin film may be produced with any of the above materials by vacuum deposition, sputtering, ion plating, coating, or any other method. While the thickness of each layer of the transparent dielectric thin film may be set at any appropriate value, it is generally from about 10 to about 200 nm, preferably from 15 to 100 nm, more preferably from 20 to 60 nm.

When two layers of the transparent dielectric thin film 5 are used, the first and second transparent dielectric thin films described below are preferably formed in this order from the resin layer side. Specifically, the first transparent dielectric thin film is preferably formed by vacuum deposition, sputtering or ion plating and preferably made of a complex oxide containing 100 parts by weight of indium oxide, 0 to 20 parts by weight of tin oxide, and 10 to 40 parts by weight of cerium oxide. The first transparent dielectric thin film preferably satisfies the relation $n2<n3 \leq n1$, wherein n1 is the refractive index of the first transparent dielectric thin film, n2 is the refractive index of the second transparent dielectric thin film, and n3 is the refractive index of the transparent conductive thin film.

The first transparent dielectric thin film is made of a complex oxide containing specific amounts of tin oxide and cerium oxide based on the amount of indium oxide. The complex oxide may be produced by doping a complex of indium oxide and tin oxide, which is a transparent conductive material, with cerium oxide, so that it can have an increased refractive index equal to or higher than that of the transparent conductive thin film. As a result, the difference between the refractive indices of the first and second dielectric thin films can be increased to facilitate the optical control so that a transparent conductive film with a high level of optical properties such as transparency can be obtained.

The first transparent dielectric thin film made of the complex oxide has a relatively high surface resistance, and its surface resistance may be controlled to be a certain high value that does not affect the conductivity of the transparent conductive thin film. As long as the surface resistance of the first transparent dielectric thin film does not affect the conductivity of the transparent conductive thin film, the first transparent dielectric thin film is preferably insulating (of high resistance) or preferably has a surface resistance of $1 \times 10^6$ (Ω/square) or more, more preferably of $1 \times 10^8$ (Ω/square) or more.

Two layers of the transparent dielectric thin film, namely the first and second transparent dielectric thin films also provide a high level of scratch resistance and bending resistance. In addition, the first transparent dielectric thin film formed as described above by a dry process with a complex oxide containing a specific amount of a specific component and having a high refractive index and a high resistance can suppress coloration of transmitted light, provide good productivity and facilitate optical control.

When the first and second transparent dielectric thin films are provided, the light refractive index n1 of the first transparent dielectric thin film, the light refractive index n2 of the second transparent dielectric thin film, and the light refractive index n3 of the transparent conductive thin film 3 preferably satisfy the relation $n2<n3 \leq n1$. The light refractive index n3 of the transparent conductive thin film 3 is generally about 2 (typically from 1.9 to 2.1), and therefore in such a case, the light refractive index n1 of the first transparent dielectric thin film is generally from about 1.9 to about 2.3, preferably from 2.0 to 2.2, and the light refractive index n2 of the second transparent dielectric thin film is generally from about 1.3 to about 1.7, preferably from 1.4 to 1.6.

The first transparent dielectric thin film is made of a complex oxide that contains indium oxide and specific amounts of tin oxide and cerium oxide based on 100 parts by weight of the indium oxide. A sintered body of a mixture of the respective oxide components is preferably used as a material for forming the thin film. In the complex oxide, the content of tin oxide is from 0 to 20 parts by weight, preferably from 3 to 15 parts by weight, based on 100 parts by weight of indium oxide, in view of optical properties. If the content of tin oxide is more than 20 parts by weight, the sintered body for use as the material for forming the thin film can have lower sintered density so that an electric discharge can hardly remain stable during the film production (the electric discharge stability can be poor). The content of cerium oxide is from 10 to 40 parts by weight, preferably from 15 to 30 parts by weight, based on 100 parts by weight of indium oxide, in view of high resistance (insulating properties) and optical properties. A cerium oxide content of less than 10 parts by weight is not preferred, because in such a case, the surface resistance of the first transparent dielectric thin film can be so low that it can have electrical conductivity. A cerium oxide content of more than 40 parts by weight is not preferred because in such a case, the productivity (sputtering rate for film production) can be reduced.

The thickness of the first transparent dielectric thin film is preferably, but not limited to, from 10 to 200 nm, more preferably from 15 to 60 nm. When the first transparent dielectric thin film has a thickness of less than 10 nm, it can be difficult to produce the film in the form of a continuous coating. The thickness is preferably 200 nm or less in view of optical adjustment.

Examples of the material for the second transparent dielectric thin film include the inorganic materials listed above for the transparent dielectric thin film and organic materials such as acrylic reins, urethane reins, siloxane polymers, alkyd resins, and melamine resins each with a light refractive index of about 1.4 to about 1.6. One or more appropriate materials may be selected or combined and used to form the second transparent dielectric thin film satisfying the refractive index n2.

The thickness of the second transparent dielectric thin film is preferably, but not limited to, 10 nm or more, more preferably from 10 to 200 nm, particularly preferably from 20 to 120 nm, in terms of producing the film in the form of a continuous coating and in terms of improving transparency or scratch resistance. If the total thickness of the first and second transparent dielectric thin films is too large, the improvement in transparency cannot be expected, and cracking can occur. Thus, the total thickness is preferably 300 nm or less, more preferably 200 nm or less.

Examples of methods for forming the first transparent dielectric thin film include vacuum deposition, vapor deposition, sputtering, and ion plating, from which an appropriate method may be selected and used depending on the type of the material and the desired film thickness. In particular, sputtering is generally used. Any of the above methods, a coating method or the like may be used as a method for forming the second transparent dielectric thin film.

The hard coat layer may be formed on one side of the film base material by performing hard coating treatment. For example, hard coat treatment may be performed by a method including applying a hard resin such as an acrylic-urethane resin or a siloxane resin and curing the hard resin. The hard coating process may include adding a rough surface-forming material such as a silicone resin to the hard resin such as the acrylic-urethane resin or the siloxane resin, so that a non-glare surface capable of preventing reflections by a mirror effect in practical applications such as touch panels can be formed simultaneously with the hard coat layer.

A too thin hard coat layer can have insufficient hardness, while a too thick hard coat layer can be cracked. Also in view of curl preventing properties and so on, the thickness of the hard coat layer is preferably from about 0.1 to about 30 µm.

Figure 3:
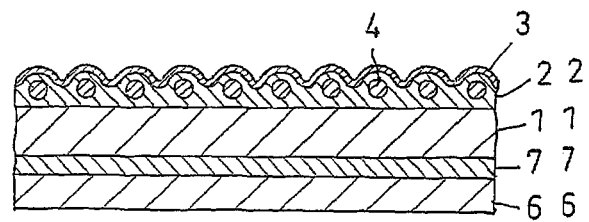
FIG. 3 is a cross-sectional view showing a further example of the transparent conductive film of the invention.
Figure 4:
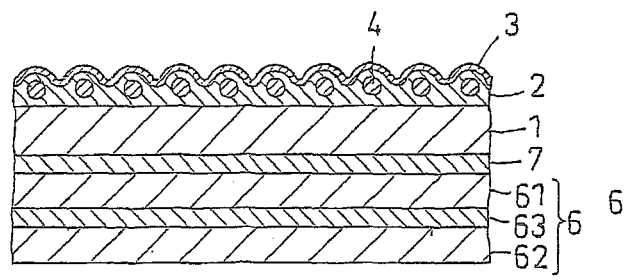
FIG. 4 is a cross-sectional view showing a further example of the transparent conductive film of the invention.

As shown in FIG. 3 or 4, another transparent substrate 6 may be bonded to the other side (not provided with the transparent conductive thin film 3) of the film base material 1 with a pressure-sensitive adhesive layer 7 interposed therebetween. The lamination may be performed by a process including forming the pressure-sensitive adhesive layer 7 on the transparent substrate 6 and then bonding the film base material 1 thereto or by a process including forming the pressure-sensitive adhesive layer 7 on the film base material 1 contrary to the above and then bonding the transparent substrate 6 thereto. The latter process allows continuous production of the pressure-sensitive adhesive layer 7 with the film base material 1 provided in the form of a roll and thus is more advantageous in view of productivity.

The pressure-sensitive adhesive layer may be of any type having transparency, and for example, an acrylic pressure-sensitive adhesive, a silicone pressure-sensitive adhesive, a rubber pressure-sensitive adhesive, or the like may be used. After the bonding of the transparent substrate, the pressure-sensitive adhesive layer has a cushion effect and thus can function to improve the scratch resistance of the conductive thin film formed on one side of the film base material or to improve the tapping resistance thereof for touch panels. In order to perform this function better, it is preferred that the elastic modulus of the pressure-sensitive adhesive layer should be set in the range of 1 to 100 N/cm$^2$ and that its thickness should be set at 1 µm or more, generally in the range of 5 to 100 µm.

If the elastic modulus of the pressure-sensitive adhesive layer is less than 1 N/cm$^2$, the pressure-sensitive adhesive layer can be inelastic so that it can easily deform by pressing to make the film base material irregular and further to make the conductive thin film irregular. If the elastic modulus is less than 1 N/cm$^2$, the pressure-sensitive adhesive can also easily squeeze out of the cut section, and the effect of improving the scratch resistance of the conductive thin film or improving the tapping resistance of the conductive thin film for touch panels can be reduced. If the elastic modulus is more than 100 N/cm$^2$, the pressure-sensitive adhesive layer can be hard, and the cushion effect cannot be expected, so that the scratch resistance of the conductive thin film or the tapping resistance thereof for touch panels cannot be improved.

If the thickness of the pressure-sensitive adhesive layer is less than 1 µm, the cushion effect also cannot be expected so that the scratch resistance of the conductive thin film or the tapping resistance thereof for touch panels cannot be expected. If the pressure-sensitive adhesive layer is too thick, its transparency can be reduced, or it can be difficult to obtain good results on the formation of the pressure-sensitive adhesive layer, the bonding workability of the transparent substrate, and the cost.

The transparent substrate bonded through the pressure-sensitive adhesive layer as described above imparts good mechanical strength to the film base material and particularly contributes to the prevention of curling and the like.

The transparent substrate 6 may be a monolayer structure as shown in FIG. 3. Alternatively, the transparent substrate 6 may be a composite structure of two or more transparent substrate films bonded to one another with a transparent pressure-sensitive adhesive layer, which can form a laminate having increased mechanical strength and so on as a whole. Concerning the transparent substrate 6, FIG. 4 shows a laminate including two transparent substrate films 61 and 62 bonded to each other with a transparent pressure-sensitive adhesive layer 63. The transparent substrate 6 with such a composite structure can have improved durability to contact pressure. In FIG. 3 or 4, the transparent substrate is bonded to the structure shown in FIG. 1. Alternatively, the transparent substrate may be bonded to the structure shown in FIG. 2 in the same way.

A description is given of the case that a monolayer structure is used as the transparent substrate. When the transparent conductive film is required to be flexible even after the transparent substrate of a monolayer structure is bonded, a plastic film with a thickness of about 6 to about 300 µm is generally used as the transparent substrate. When flexibility is not particularly required, a glass plate with a thickness of about 0.05 to about 10 mm or a plastic film or plate with a thickness of about 0.05 to about 10 mm is generally used as the transparent substrate. Examples of the plastic material include those described above for the film base material.

When a composite structure is used as the transparent substrate, the thickness of the transparent substrate may be the same as described above. The thickness of the transparent substrate of the composite structure is the total thickness of a laminate of two or more transparent substrate films bonded to one another with a transparent pressure-sensitive adhesive layer. That is, when the transparent conductive film is required to be flexible even after the transparent substrate of the composite structure is bonded, the thickness of the transparent substrate of the composite structure is generally from about 6 to about 300 μm. In this case, the two or more transparent substrate films to be used may be plastic films that are of the same type as the film base material. When flexibility is not particularly required, the thickness of the transparent substrate is generally from about 0.05 to about 10 mm. In this case, glass plates or plastic films or plates may be used as the two or more transparent substrate films. These may also be used in combination. Examples of the plastic material include those described above for the film base material.

In the transparent substrate of the composite structure, the material described above for the lamination of the transparent substrate and the film base material is preferably used for the transparent pressure-sensitive adhesive layer for bonding two or more transparent substrate films.

If necessary, an antiglare or antireflection layer for improving visibility or a hard coat layer for protecting the outer surface may be formed on the outer surface of the transparent substrate (the surface opposite to the pressure-sensitive adhesive layer). For example, a cured coating film made from a curable resin such as a melamine resin, a urethane resin, an alkyd resin, an acrylic resin, or a silicone resin is preferably used as the hard coat layer.

The transparent conductive film of the invention may be used to form a variety of devices such as touch panels and liquid crystal displays. In particular, the transparent conductive film of the invention is preferably used as an electrode sheet for touch panels.

A touch panel includes a touch panel electrode sheet that has a transparent conductive thin film and is provided on the touch side, another touch panel electrode sheet that has a transparent conductive thin film and is provided on the display side, and a spacer, wherein the electrode sheet for use in touch panel are placed opposite to each other with the spacer interposed therebetween such that the transparent conductive thin films face each other. The transparent conductive film of the invention may be used to form any of the electrode sheets for use in touch panel on the touch side and the display side. In particular, the transparent conductive film of the invention is preferably used to form the touch panel electrode sheet on the display side, in terms of suppressing the formation of Newton's rings, providing satisfactory durability and display characteristics and reducing the thickness of touch panels.

Figure 5:
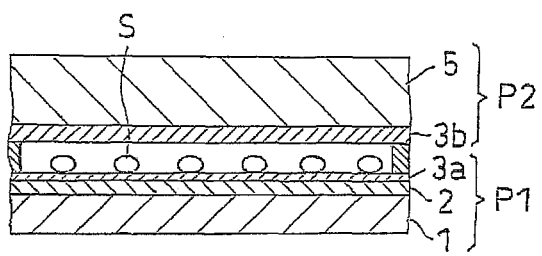
FIG. 5 is a cross-sectional view showing a touch panel using the transparent conductive film of the invention.

FIG. 5 illustrates an example of the touch panel using the transparent conductive film of the invention shown in FIG. 1 as the touch panel electrode sheet on the display side. Specifically, the touch panel includes a pair of panel plates P1 and P2 (electrode sheet for use in touch panel) that have transparent conductive thin films 3a and 3b, respectively and are arranged opposite to each other with spacers S interposed therebetween in such a manner that the transparent conductive thin films 3a and 3b are orthogonal and opposite to each other. In such a touch panel, the transparent conductive film shown in FIG. 1 is used as the panel plate P1 on the display side (lower side). In FIG. 5, fine particles 4 shown in FIG. 1 are omitted from the resin layer 2 of the transparent conductive film.

Such a touch panel functions as a transparent switch in which tapping on the panel plate P2 side with an input pen allows contact between the transparent conductive thin films 3a and 3b to produce the ON state of an electric circuit, while removal of the press turns it to the original OFF state. In this structure, the panel plate P1 is made of the transparent conductive film described above so that Newton's rings are prevented and that satisfactory durability and display characteristic are provided.

In FIG. 5, the panel plate P2 includes a transparent substrate 5 made of a plastic film, a glass plate or the like, and a transparent conductive thin film 3b provided thereon. Alternatively, the transparent conductive film shown in FIG. 1 may also be used as the panel plate P2, like the panel plate P1.

EXAMPLES

The invention is more specifically described below by showing some examples of the invention in contrast with some comparative examples. Hereinafter, the term "part or parts" means part or parts by weight.

Example 1

Preparation of Coating Liquid

The fine particles used was a mixture of 0.5 parts of a monodisperse filler with an average particle size of 2.2 μm (material, crosslinked acrylic resin; particle size standard deviation, 0.22 μm; product grade, MX-type manufactured by Soken Chemical & Engineering Co., Ltd.) and 0.1 parts of a monodisperse filler with an average particle size of 3 μm (material, crosslinked acrylic resin; particle size standard deviation, 0.3 μm; product grade, MX-type manufactured by Soken Chemical & Engineering Co., Ltd.). A solution was prepared by mixing the fine particle mixture, 100 parts of an ultraviolet curable resin (acrylic-urethane resin Unidic 17-806 (trade name) manufactured by Dainippon Ink and Chemicals, Incorporated), 5 parts of a photopolymerization initiator (Irgacure 184 (trade name) manufactured by Ciba Specialty Chemicals Inc.), and a solvent (toluene) in such an amount that the solution had a solids content of 50% by weight.

Preparation of Resin Layer

The resulting coating liquid was applied with a wire bar to one side of a transparent film base material made of a 100 μm-thick polyethylene terephthalate film such that the coating would have a thickness of 1.1 μm after drying. Thereafter, the coating was dried at 100° C. for 3 minutes and then cured by ultraviolet irradiation to form a resin layer whose surface had fine irregularities.

Preparation of Transparent Conductive Film

A 20 nm-thick transparent conductive thin film of a complex oxide composed of indium oxide and tin oxide (ITO thin film with a refractive index of 2.0) was then formed on the resin layer in an atmosphere of 80% argon gas and 20% oxygen gas under a pressure of $4 \times 10^{-1}$ Pa by a sputtering method using a sintered body of a mixture of indium oxide and tin oxide (97% by weight of indium oxide and 3% by weight of tin oxide), so that a transparent conductive film was prepared.

Example 2

The coating liquid prepared in Example 1 was used. A resin layer was formed using the process of Example 1, except that the thickness of the coating for the resin layer was changed to 1.4 μm in the process of forming the resin layer. A transparent conductive film was then prepared using the process of Example 1.

Example 3

The coating liquid prepared in Example 1 was used. A resin layer was formed using the process of Example 1, except that the thickness of the coating for the resin layer was changed to 1.8 μm in the process of forming the resin layer. A transparent conductive film was then prepared using the process of Example 1.

Example 4

The coating liquid prepared in Example 1 was used. A resin layer was formed using the process of Example 1, except that the thickness of the coating for the resin layer was changed to 0.8 μm in the process of forming the resin layer. A transparent conductive film was then prepared using the process of Example 1.

Example 5

Preparation of Transparent Dielectric Layer

A 23 nm-thick high-refractive-index thin film (2.2 in refractive index) of a complex oxide composed of indium oxide, tin oxide and cerium oxide was formed on the resin layer (formed in Example 1) in an atmosphere of 95% argon gas and 5% oxygen gas under a pressure of $4 \times 10^{-1}$ Pa by a sputtering method using, as a target, a sintered body of a mixture of indium oxide, tin oxide and cerium oxide (68% by weight of indium oxide, 2% by weight of tin oxide and 30% by weight of cerium oxide). A silica sol (Colcoat P manufactured by Colcoat Co., Ltd.) was diluted with ethanol so as to have a solids content of 2%. The diluted silica sol was applied to the high-refractive-index thin film and dried and cured at 150° C. for 2 minutes to form an about 50 nm-thick $SiO_2$ thin film (1.45 in refractive index). The refractive index was measured at a wavelength of 589 nm with an Abbe refractometer DR-M2/1550 manufactured by Atago Co., Ltd.

Preparation of Transparent Conductive Film

A transparent conductive thin film (ITO thin film) was formed on the $SiO_2$ thin film using the process of Example 1 so that a transparent conductive film was prepared.

Comparative Example 1

A coating liquid was prepared using the coating liquid preparation process of Example 1, except that 0.6 parts of a monodisperse filler with an average particle size of 3 μm was used for the fine particles instead. A resin layer was formed using the process of Example 1, except that the resulting coating liquid was used instead, and a transparent conductive film was prepared using the process of Example 1.

Comparative Example 2

The coating liquid prepared in Example 1 was used. A resin layer was formed using the process of Example 1, except that the thickness of the coating for the resin layer was changed to 2.1 μm in the process of forming the resin layer. A transparent conductive film was then prepared using the process of Example 1.

Comparative Example 3

A coating liquid was prepared using the coating liquid preparation process of Example 1, except that 0.1 parts of a monodisperse filler with an average particle size of 4 μm (material, crosslinked acrylic resin; particle size standard deviation, 0.4 μm; product grade, MX-type manufactured by Soken Chemical & Engineering Co., Ltd.) was used for the fine particles instead. A resin layer was formed using the process of Example 1, except that the resulting coating liquid was used instead, and a transparent conductive film was prepared using the process of Example 1.

Comparative Example 4

A coating liquid was prepared using the coating liquid preparation process of Example 1, except that 0.1 parts of a monodisperse filler with an average particle size of 4 μm (material, crosslinked acrylic resin; particle size standard deviation, 0.4 μm; product grade, MX-type manufactured by Soken Chemical & Engineering Co., Ltd.) was used for the fine particles instead. Then a resin layer was formed using the process of Example 1, except that the thickness of the coating for the resin layer was changed to 1.4 μm in the process of forming the resin layer. A transparent conductive film was then prepared using the process of Example 1.

Comparative Example 5

A coating liquid was prepared using the coating liquid preparation process of Example 1, except that 0.1 parts of a monodisperse filler with an average particle size of 4 μm (material, crosslinked acrylic resin; particle size standard deviation, 0.4 μm; product grade, MX-type manufactured by Soken Chemical & Engineering Co., Ltd.) and 0.1 parts of a monodisperse filler with an average particle size of 5 μm (material, crosslinked acrylic resin; particle size standard deviation, 0.5 μm; product grade, MX-type manufactured by Soken Chemical & Engineering Co., Ltd.) were used for the fine particles instead. Then a resin layer was formed using the process of Example 1, except that the thickness of the coating for the resin layer was changed to 1.4 μm in the process of forming the resin layer. A transparent conductive film was then prepared using the process of Example 1.

The transparent conductive film of each of Examples 1 to 4 and Comparative Examples 1 to 5 described above was evaluated as described below. The results are shown in Table 1.

Surface Profile of the Transparent Conductive Thin Film of the Transparent Conductive Film According to JIS B 0601 (1994), the surface profile was measured using a stylus-type surface roughness meter ET-4000 manufactured by Kosaka Laboratory Ltd. Specifically, the irregular surface was scanned with a measuring stylus 1 mm in diameter having a conical diamond edge (55 degrees in vertical angle) over a length of 3 mm in a certain direction. In this process, the shift of the measuring stylus in the vertical direction was measured, and the resulting surface roughness curve on which the shift was recorded was used for calculating the average centerline roughness (Ra), the maximum height (Ry), the average peak-to-peak distance (S), and the ten-point average roughness (Rz).

Measurement of the Haze of the Transparent Conductive Film

According to JIS K7105, the measurement was performed using a haze meter HMG-2DP manufactured by Suga Test Instruments Co., Ltd.

Measurement of the Light Transmittance of the Transparent Conductive Film

Visible light transmittance was measured at a light wavelength of 550 nm using a spectrophotometer UV-240 manufactured by Shimadzu Corporation.

Preparation of Touch Panel

The transparent conductive film of each example was used as one of the panel plates (as the panel plate on the display side). A glass plate on which a 30 nm-thick ITO thin film was formed by the same method as described above was used as the other panel plate. Both panel plates were arranged opposite to each other with 20 μm-thick spacers interposed therebetween in such a manner that the ITO thin films faced each other and the gap between both panel plates was adjusted to 150 μm, so that a touch panel for serving as a switch structure was prepared. The respective ITO thin films of both panel plates were formed such that they would be orthogonal to each other when placed opposite to each other as describe above.

Formation of Newton's Rings
   3: Formation of Newton's rings is not observed.
   2: Formation of Newton's rings is observed at an insignificant level.
   1: Formation of Newton's rings is significantly observed.

Glare
   3: Glare is absent.
   2: Glare is at low level and practically insignificant.
   1: Glare is present.

Durability

The pen input durability of the touch panel of each example was measured by the method described below.

Pen Input Durability Under High Load (A) A polyacetal pen (0.8 mm in nib R) was allowed to slide 300,000 times under a load of 500 g on the surface of the panel plate formed of the transparent conductive film. After the sliding, the linearity was measured as described below, and the pen input durability under a high load was evaluated.

Method for Measuring Linearity

A voltage of 5 V was applied to the transparent conductive laminate, in which an output voltage was measured between a voltage-applied terminal A (measurement start point) and a terminal B (measurement end point).

The linearity was calculated from the formulae:

$$E_{XX}(\text{theoretical value}) = \{X(E_B - E_A)/(B - A)\} + E_A$$

$$\text{Linearity}(\%) = [(E_{xx} - E_x)/(E_B - E_A)] \times 100, \text{ wherein}$$

$E_A$ is the output voltage at the measurement start point A, $E_B$ is the output voltage at the measurement end point B, $E_X$ is the output voltage at each measurement point X, and $E_{XX}$ is the theoretical value.

Figure 6:
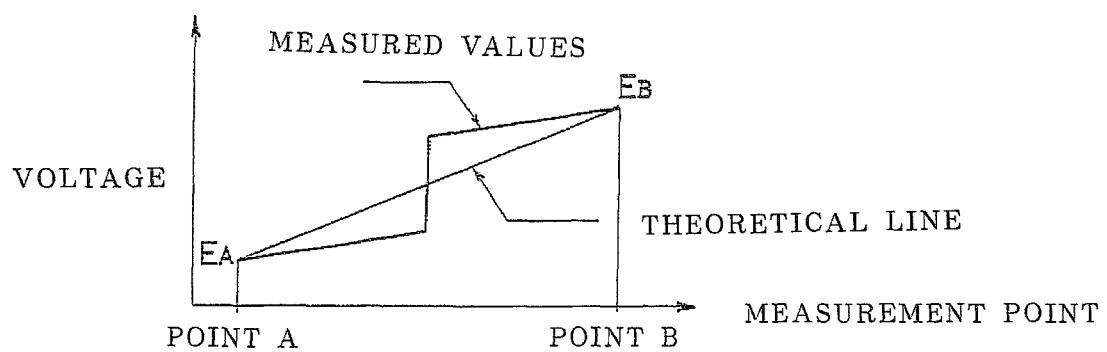
FIG. 6 is a schematic diagram showing the outline of measurement of linearity.

The outline of the measurement of the linearity is shown in FIG. 6. In a touch panel-equipped image display, the position of the pen displayed on the screen is determined from the resistance value of the portion where the upper and lower panels are brought into contact with each other by pressing with a pen. The resistance value is determined assuming that the output voltage is distributed on the surface of the upper and lower panels according to the theoretical line (ideal line). If the measured voltage value deviates from the theoretical line as shown in FIG. 6, the actual position of the pen will not well synchronize with the pen position on the screen that is determined from the resistance value. Such a deviation from the theoretical line corresponds to the linearity. The larger the linearity value, the larger the deviation of the actual pen position from the pen position on the screen.

(B) A polyacetal pen (0.8 mm in nib R) was allowed to slide 100,000 times under each load on the surface of the panel plate formed of the transparent conductive film. The maximum load under which the linearity was 1.5% or less after the sliding was determined. The fact that the load is high indicates that the pen input durability is high.

TABLE 1

| | Resin Layer | | Conductive Thin Film | | | | Transparent Conductive Film | | Evaluations | | | |
| | Coating | Fine | Surface Profile | | | | | | Display Characteristics | | High-Load Pen-Input Durability | |
| | Thickness (μm) | Particle Size (μm) | Ra (μm) | Ry (μm) | Rz (μm) | S (mm) | Haze (%) | Transmittance (%) | Newton's Rings | Glare | (A) Linearity (%) | (B) Load (kg) |
|---|---|---|---|---|---|---|---|---|---|---|---|---|
| Example 1 | 1.1 | 2.2 + 3 | 0.14 | 1.42 | 0.88 | 0.08 | 1.8 | 87.5 | 3 | 2 | 0.5 | 2.0 |
| Example 2 | 1.4 | 2.2 + 3 | 0.13 | 1.16 | 0.76 | 0.09 | 1.4 | 88.0 | 2 | 2 | 0.5 | 2.0 |
| Example 3 | 1.8 | 2.2 + 3 | 0.12 | 1.05 | 0.65 | 0.10 | 1.2 | 88.0 | 2 | 2 | 0.5 | 2.0 |
| Example 4 | 0.8 | 2.2 + 3 | 0.17 | 1.55 | 0.95 | 0.07 | 2.0 | 87.5 | 3 | 2 | 0.5 | 2.0 |
| Example 5 | 1.1 | 2.2 + 3 | 0.14 | 1.42 | 0.88 | 0.08 | 1.8 | 90.5 | 3 | 2 | 0.5 | 2.0 |
| Comparative Example 1 | 1.1 | 3 | 0.16 | 1.41 | 0.85 | 0.15 | 1.1 | 88.0 | 3 | 1 | 0.5 | 2.0 |
| Comparative Example 2 | 2.1 | 2.2 + 3 | 0.10 | 0.98 | 0.56 | 0.18 | 0.7 | 88.0 | 1 | 2 | 0.5 | 2.0 |
| Comparative Example 3 | 1.1 | 2.2 + 3 + 4 | 0.14 | 1.81 | 0.88 | 0.13 | 1.8 | 87.5 | 3 | 2 | 2.0 | 1.0 |
| Comparative Example 4 | 1.4 | 2.2 + 3 + 4 | 0.13 | 1.28 | 0.80 | 0.12 | 1.3 | 88.0 | 2 | 2 | 2.0 | 1.0 |
| Comparative Example 5 | 1.4 | 2.2 + 3 + 4 + 5 | 0.18 | 1.71 | 1.00 | 0.08 | 2.4 | 87.5 | 3 | 3 | 5.0 | 0.5 |

It is apparent that according to Examples above, Newton's rings and glare are each evaluated as 2 or more, the haze can be set at a low level of 2.0% or less, and the pen input durability is high.

INDUSTRIAL APPLICABILITY

The transparent conductive film of the invention is useful for electrode sheet for use in touch panel.

The invention claimed is:

1. A transparent conductive film, comprising:
a transparent film base material;
a resin layer having fine irregularities; and
a transparent conductive thin film placed on one side of the transparent film base material with at least the resin layer interposed therebetween,
wherein the transparent conductive thin film has a surface with an average centerline roughness (Ra) of 0.11 μm to 0.18 μm, a maximum height (Ry) of 0.9 μm to 1.6 μm, and an average peak-to-peak distance (S) of 0.05 mm to 0.11 mm, and the transparent conductive film has a haze of 2.5% or less, wherein the surface of the transparent conductive thin film has a ten-point average roughness (Rz) of 0.6 to 1 μm.

2. The transparent conductive film according to claim 1, wherein the resin layer having fine irregularities contains fine particles for forming the fine irregularities.

3. The transparent conductive film according to claim 2, wherein the fine particles are a mixture of fine particles having an average particle size of 2±0.4 μm and a particle size standard deviation within 20% of the average particle size and fine particles having an average particle size of 3±0.4 μm and a particle size standard deviation within 20% of the average particle size.

4. The transparent conductive film according to claim 1, wherein the resin layer has a coating thickness of 0.5 to 2 μm.

5. The transparent conductive film according to claim 1, further comprising a transparent dielectric thin film between the resin layer and the transparent conductive thin film.

6. The transparent conductive film according to claim 1, further comprising a transparent substrate and a transparent pressure-sensitive adhesive layer, wherein a side of the transparent film base material where the transparent conductive thin film is not provided is bonded to the transparent substrate with the transparent pressure-sensitive adhesive layer interposed therebetween.

7. The transparent conductive film according to claim 6, wherein the transparent substrate is a transparent laminated substrate comprising at least two transparent substrate films laminated with a transparent pressure-sensitive adhesive layer interposed therebetween.

8. A touch panel electrode sheet, comprising the transparent conductive film according to claim 1.

9. A touch panel, comprising:
a touch panel electrode sheet that has a transparent conductive thin film and is provided on a touch side;
another touch panel electrode sheet that has a transparent conductive thin film and is provided on a display side; and
a spacer, wherein
the electrode sheet for use in touch panel are placed opposite to each other with the spacer interposed therebetween such that the transparent conductive thin films face each other, and
at least one of the electrode sheet for use in touch panel comprises the touch panel electrode sheet according to claim 8.

10. The touch panel according to claim 9, the touch panel electrode sheet is provided on at least the display side.

11. The transparent conductive film according to claim 1 wherein the transparent conductive film has a haze of 2.0% or less.

* * * * *